US011884521B2

(12) United States Patent
Urban

(10) Patent No.: US 11,884,521 B2
(45) Date of Patent: Jan. 30, 2024

(54) MOBILE CRANE WITH A LUFFING MAIN BOOM AND WITH AN ADDITIONAL BOOM SYSTEM

(71) Applicant: Tadano Demag GmbH, Zweibrücken (DE)

(72) Inventor: Christian Moritz Urban, Zweibrücken (DE)

(73) Assignee: Tadano Demag GmbH, Zweibrucken (DE)

( * ) Notice: Subject to any disclaimer, the term of this patent is extended or adjusted under 35 U.S.C. 154(b) by 247 days.

(21) Appl. No.: 17/556,158

(22) Filed: Dec. 20, 2021

(65) Prior Publication Data

US 2022/0194754 A1 Jun. 23, 2022

(30) Foreign Application Priority Data

Dec. 22, 2020 (DE) ......................... 102020134714.6

(51) Int. Cl.

| | |
|---|---|
| ***B66C 23/00*** | (2006.01) |
| ***B66C 23/42*** | (2006.01) |
| ***B66C 23/82*** | (2006.01) |
| ***B66C 23/70*** | (2006.01) |

(52) U.S. Cl.

CPC ............ *B66C 23/42* (2013.01); *B66C 23/702* (2013.01); *B66C 23/826* (2013.01)

(58) Field of Classification Search

CPC ......... B66C 23/04; B66C 23/06; B66C 23/14; B66C 23/42; B66C 23/64; B66C 23/66; B66C 23/68; B66C 23/70; B66C 23/826

See application file for complete search history.

(56) References Cited

U.S. PATENT DOCUMENTS

| | | | |
|---|---|---|---|
| 11,130,659 | B2 | 9/2021 | Muller |
| 11,167,962 | B2 | 11/2021 | Weckbecker et al. |
| 11,174,137 | B2 | 11/2021 | Muller |
| 2021/0139296 | A1 | 5/2021 | Heintz |

(Continued)

FOREIGN PATENT DOCUMENTS

| | | |
|---|---|---|
| CN | 202924635 U | 5/2013 |
| CN | 107117542 A | 9/2017 |

(Continued)

OTHER PUBLICATIONS

Co-pending U.S. Appl. No. 17/416,077, filed Jun. 18, 2021.
Co-pending U.S. Appl. No. 17/520,913, filed Nov. 8, 2021.

*Primary Examiner* — Emmanuel M Marcelo

(74) *Attorney, Agent, or Firm* — Gardner, Linn, Burkhart & Ondersma LLP

(57) ABSTRACT

A vehicle crane having a luffable main jib and an additional jib system arranged on a free end section of the main jib and comprising a first additional jib part and a second additional jib part. To further reduce the weight of the additional jib system and the vehicle crane fitted therewith, and to permit an overall more economical mode of production, the first additional jib part has a rectangular cross-section having four longitudinal chords connected together via transverse struts or/and diagonal struts and the second additional jib part has a triangular cross-section having three longitudinal chords connected together via transverse struts, wherein the two additional jib parts are coupled, or can be coupled, together via a cross-section change adapter.

20 Claims, 5 Drawing Sheets

(56) References Cited

U.S. PATENT DOCUMENTS

| | | | | |
|---|---|---|---|---|
| 2021/0179398 | A1* | 6/2021 | Urban | B66C 23/82 |
| 2021/0188601 | A1 | 6/2021 | Urban | |
| 2021/0261388 | A1* | 8/2021 | Urban | B66C 23/702 |
| 2021/0323796 | A1 | 10/2021 | Zimmer | |

FOREIGN PATENT DOCUMENTS

| | | | | | |
|---|---|---|---|---|---|
| CN | 111137796 | A | | 5/2020 | |
| DE | 102005049606 | A1 | | 4/2007 | |
| DE | 102007056289 | B4 | | 6/2009 | |
| DE | 102012023357 | A1 | * | 5/2014 | B66C 23/702 |
| DE | 202013003309 | U1 | | 7/2014 | |
| DE | 102007051539 | C5 | * | 4/2018 | B66C 23/82 |
| DE | 202017107301 | U1 | | 12/2018 | |
| DE | 102018122349 | A1 | | 3/2020 | |
| EP | 2055665 | A1 | * | 5/2009 | B66C 23/702 |
| EP | 1634846 | B1 | | 12/2009 | |
| JP | 2011157178 | A | * | 8/2011 | |
| WO | 2020011657 | A1 | | 1/2020 | |

* cited by examiner

MOBILE CRANE WITH A LUFFING MAIN BOOM AND WITH AN ADDITIONAL BOOM SYSTEM

CROSS REFERENCE TO RELATED APPLICATION

The present application claims the priority benefits of German Application No. 10 2020 134 714.6, filed on Dec. 22, 2020.

BACKGROUND AND FIELD OF THE INVENTION

The invention relates to a vehicle crane having a luffable main jib and an additional jib system arranged on a free end section of the main jib and comprising a first additional jib part and a second additional jib part.

Owing to their intrinsic mobility, vehicle cranes offer a much quicker usage option compared with stationary cranes. In addition to vehicle cranes fitted with a crawler track, primarily those with a rubber-tired wheeled running gear unit permit immediate use on the public road network. Depending up on the wheeled running gear unit, these also permit travel on unsurfaced areas, which gives rise to extremely flexible usability for such vehicle cranes. The jib thereof which is luffable in a vertical plane and rotatable about a horizontal axis and often also telescopic in length allows a working region around the respective installation site of such a vehicle crane to be covered, the surface area of the working region being dependent on the dimensions and mobility of the jib.

In particular, very large designs of vehicle cranes at times have to be partially disassembled before they are moved in order to be able to comply with the permissible dimensions for road traffic and the maximum load on the road structure. Independently thereof, the reduction of the dead weight is a constant incentive for further developments from an ecological and also purely economical point of view. In terms of the loads on the parts of the jib, which loads increase as the length of the jib increases, this provides a corresponding potential for optimization. This relates to the design of its section not provided for regular disassembly as well as the additional components used for extending the jib.

For instance, German utility model DE 20 2013 003 309 U1 discloses a mobile tower crane having a fixed tower and a jib which is arranged to be luffable to a limited extent at its free end via a guying arrangement, wherein a trolley and an entrained lifting cable can move on the lower side of the jib in order to position a load picking-up means, coupled to the lifting cable, within the working region of the tower crane. In order to reduce the weight of the jib, formed as a lattice girder, in particular towards its free end, the chords of the jib extending in the longitudinal direction thereof, each being formed in one piece and in this respect without welding, are provided with a cross-section tapering towards the free end. The jib has a total of three chords connected to each other via transverse struts and/or diagonal struts, namely an upper chord and two lower chords, thus producing a triangular cross-section for the jib. In addition to the design on the basis of three chords, the cross-section changes thereof adapted to the permissible load-bearing capability also contribute to the reduction of the jib weight.

Furthermore, a further tower crane having a horizontal jib is already known from Chinese utility model CN 202 924 635 U. The jib consists of a first jib part with a rectangular cross-section, to which a second jib part having a triangular cross-section is connected directly via a hinge and in the region of the respective lower chords. The first and second jib parts are kept in a horizontal position via a guying arrangement. For this purpose, a vertical guying mast extends from the hinge to a guying cable of the guying arrangement.

A vehicle crane having a wheeled running gear unit is disclosed in German laid-open document DE 10 2005 049 606 A1, the main jib of which is luffable, rotatable, telescopic and can be extended by a two-part additional jib system. This includes a first additional jib part coupled to the jib head of the main jib via an adapter and a second additional jib part, connected thereto, in the sense of a tip jib. Both additional jib parts are formed as lattice girders which are composed of chords and transverse struts and diagonal struts connecting the chords together. The free additional jib part is supported on the first additional jib part via a hinge assembly such that it can be pivoted with respect to the first additional jib part actively by a linear drive.

Chinese laid-open document CN 1 11 137 796 A discloses a terrain crane comprising a crane running gear unit and a telescoping jib which is fastened at the lower end to a rotatable superstructure on the crane running gear unit and is extended at the upper end by a luffable jib. A cross-beam arm, which is also luffable, is arranged on the luffable jib. The jib and the cross-beam arm are each formed as rectangular lattice mast structures having associated longitudinal chords, diagonal struts and transverse struts.

European patent EP 1 634 846 B1 discloses a tower crane comprising a crane jib which can be composed of a plurality of jib pieces. The jib pieces are designed such that they can be slid one inside the other during transport as container freight owing to different cross-section geometries, and the lower chords thereof, after being assembled together, form a continuously offset-free and gap-free running track for a trolley of the tower crane. The jib pieces are connected together by means of end-side coupling pieces in the form of pin-plug connections at the ends thereof.

German utility model DE 20 2017 107 301 U1 describes a further tower crane having an upright tower, a jib and a counter jib. A jib guying arrangement is guided from a tower tip to the jib and to the counter jib. The smaller, inner jib part is guyed via the relatively low tower tip. The larger, outer jib part is not guyed and is formed as a beam jib and is adapted in jib height to the loads occurring at that location. The jib can be formed as a truss jib and as a three-chord jib, wherein a plurality of longitudinal chords are rigidly connected together by transverse braces.

German laid-open document DE 10 2018 122 349 A1 discloses a further tower crane consisting of an upright tower, a jib and a counter jib. The jib includes an inner and an outer jib part, wherein the inner jib part is formed as a beam and the outer jib part is articulated on the inner jib part in the manner of a hinge and is held by the guying arrangement. The jib can be assembled from a plurality of longitudinal chords having different cross-sections, and so the inner jib part has a rectangular profile and the outer jib part has a triangular profile.

SUMMARY OF THE INVENTION

The present invention provides an improved vehicle crane having a luffable main jib and an additional jib system to the extent that an overall further reduction in weight and overall more economical mode of production are possible.

In accordance with an aspect of the invention, in the case of a vehicle crane having a luffable main jib and an additional jib system arranged at least indirectly on a free end section of the main jib and including a first additional jib part and a second additional jib part, a reduction in weight and an overall more economical mode of production are achieved by virtue of the fact that the first additional jib part has a rectangular cross-section having four longitudinal chords connected together via transverse struts or/and diagonal struts and the second additional jib part has a triangular cross-section having three longitudinal chords connected together via transverse struts, wherein the two additional jib parts are coupled, or can be coupled, together via a cross-section change adapter.

The advantage produced thereby resides in a considerably reduced dead weight of the additional jib system with a design which, at the same time, is adapted to the required strengths thereof. In particular, the second additional jib part forming the free end section of the jib, which can thus be assembled in parts, has an actual lower load for the additional jib system as a whole owing to its reduction to three—instead of otherwise four-longitudinal chords of lower weight. Owing to the short length of the second additional jib part compared to the rest of the jib, the bending load thereof and the tensile load associated therewith in at least one of its longitudinal chords is low anyway, and so the strength thereof which can be achieved with three longitudinal chords also still meets the requirements of the load-bearing capability thereof. The saving in weight which can be achieved thereby, with an at least approximately identical load-bearing capability, can result in this respect completely in an increased load capacity of the additional jib system and a vehicle crane fitted therewith. In contrast to a design having four longitudinal chords, the production of the thus configured second additional jib part additionally requires the use of less material, thereby producing a more economical mode of production for this second additional jib part and thus for the entire additional jib system.

According to a further development of the basic concept of the invention, the first additional jib part or/and the second additional jib part can be supported on the cross-section change adapter so as to be pivotable via a hinge assembly. In particular, owing to a thus possible, free luffability of the second additional jib part, an ideal adaptation of the geometry of the additional jib system to the respective orientation or/and requirement of the jib assembled at least in parts in this manner can be achieved. This can also be changed accordingly as required.

In an advantageous manner, at least one linear drive can be provided in the vehicle crane in accordance with the invention, by means of which the first additional jib part or/and the second additional jib part can be pivoted with respect to the cross-section adapter actively in the sense of rockers. Preferably, said pivotability can occur about the previously mentioned hinge assembly. Such a design can be used without any guying arrangement which, of course, could be used as an alternative or supplement in order to pivot one of the additional jib parts.

Alternatively, provision can be made that the first additional jib part and the second additional jib part are each rigidly fastened to the cross-section change adapter. "Rigidly fastened" is understood to mean that the first additional jib part and the second additional jib part are connected so as not to be luffable with respect to each other.

In accordance with an aspect of the invention, provision is made for the additional jib system to be able to be guyed via at least one suitable guying system or arrangement. Such a guying arrangement can be produced by interpositioning at least one intermediate guying arrangement or guying support or member such as a pressure support or an additional tensile element or member which is connected to the first additional jib part or/and the second additional jib part and/or to the cross-section change adapter in order to obtain an advantageous ratio in relation to the internal forces of the guying arrangement or/and of the additional jib system. Preferably, this pressure support or this tensile element can then be connected to the cross-section change adapter, wherein, of course alternatively or in addition, positioning on the lattice mast jib or telescoping jib, each to be coupled to the additional jib system, or an extension coupled to said jibs can be effected.

For an expedient and economical design of the additional jib system, a length for the first additional jib part of 4.0 m to 150.0 m is considered. Preferably, this length can be 5.0 m to 65.0 m. This order of magnitude additionally clearly shows that the first additional jib part is a component which is clearly to be differentiated from an adapter which is sometimes used and can be coupled directly to a jib head. In fact, such an adapter can additionally be arranged between the first additional jib part of the additional jib system and a jib to be fitted therewith.

Depending upon the design, the first additional jib part and the second additional jib part are a common component of an auxiliary jib. As an alternative thereto, these two additional jib parts can together form such an auxiliary jib. The auxiliary jib configured in this manner can be free of a guying arrangement or/and be luffable and this is dependent on the requirements to be placed thereon.

Alternatively or in addition thereto, the first additional jib part itself can be a main jib extension. This means that this additional jib part forms the main jib extension which can be coupled to a jib, whereas another design can make provision for the additional jib system to be able to be coupled to a jib e.g. not directly but instead only with interpositioning of a main jib extension.

Furthermore, alternatively or in addition thereto the second additional jib part can be an auxiliary jib. In this case, the additional jib system itself does not form an auxiliary jib, just the second additional jib part thereof. The first additional jib part then represents a main jib extension. As already mentioned at another point, this can then be connected to the first additional jib part either rigidly or in the manner of a hinge.

The vehicle crane, now presented, in accordance with the invention offers an extremely advantageous further reduction in the weight thereof with, at the same time, a more economical mode of production. In this respect, the invention deviates from the otherwise typical retention of the cross-sections of an additional jib system composed of two parts because in particular the desired advantages can be achieved in the reduction of the second additional jib part to three longitudinal chords and accordingly fewer transverse struts or/and diagonal struts, which reduction is associated with a change in cross-section.

The cross-section change adapter in accordance with the invention is used for coupling a first additional jib part, which is rectangular in cross-section, to a second additional jib part which is triangular in cross-section. The additional jib parts to be coupled together can preferably be those of the previously specified additional jib system in accordance with the invention, and so the cross-section change adapter described in more detail hereinafter can be a component of the additional jib system.

The cross-section change adapter in accordance with the invention includes a first connection side formed for coupling to the first additional jib part and a second connection side formed for coupling to the second additional jib part. The connection sides of the cross-section change adapter can be placed e.g. in parallel with, and spaced apart from, each other. Of course, these can also form an angle between them if required in order to influence the orientation of the two additional jib parts accordingly. In each case, the first of the two connection sides has four corner regions which span a rectangular or quadratic plane there between. In contrast, the second connection side only has three corner regions which span an accordingly triangular plane there between.

Two of the total of four corner regions of the first connection side—hereinafter referred to as upper corner regions of the first connection side—are provided for arrangement in the region of an upper side of the first additional jib part in normal usage. In contrast, only one of the total of three corner regions of the second connection side—hereinafter referred to as upper corner region of the second connection side—is provided for arrangement in the region of an upper side of the second additional jib part in normal usage. The two upper corner regions of the first connection side are connected to the upper corner region of the second connection side by an upper chord in each case. These two upper chords naturally form an angle therebetween.

The other two corner regions of the first connection side—hereinafter referred to as lower corner regions of the first connection side—are provided for arrangement in the region of a lower side of the first additional jib part, opposite to its upper side, in normal usage. In contrast, the other two corner regions of the second connection side—hereinafter referred to as lower corner regions of the second connection side—are provided for arrangement in the region of a lower side of the second additional jib part, opposite to its upper side, in normal usage. The two lower corner regions of the first connection side are connected to one of the lower corner regions of the second connection side by a lower chord in each case. Preferably, the two lower chords can extend substantially next to each other, and so they do not cross each other. The arrangement thereof can then be referred to as “cross-free”.

One of the lower corner regions of the first connection side is connected to the single upper corner region of the second connection side by a first transverse strut, whilst a lower corner region of the other second connection side diagonally opposite the lower corner region of the first connection side connected to said first transverse strut is connected to one of the upper corner regions of the first connection side by a second transverse strut.

Lastly, two of the diagonally opposite lower corner regions of the first connection side and of the second connection side are connected together by a third transverse strut. Preferably, said third transverse strut can connect the lower corner region of the first connection side, already connected to the first transverse strut, to the lower corner region of the second connection side, already connected to the second transverse strut. Alternatively, the third transverse strut can also be arranged such that it connects the two individual lower corner regions of the first connection side and the second connection side which have no direct connection to the first transverse strut and the second transverse strut.

With regard to the terminology used, the invention assumes that a transverse strut always extends in, or in parallel with, lateral planes of the lattice girder spanned between two chords in each case, whilst a diagonal strut connects together in each case two of these lateral planes or the corner regions thereof located between two adjoining lateral planes and thus extends quasi through the space, enclosed by the lateral planes, of the lattice girder.

The advantages resulting from the cross-section change adapter have already been explained in greater detail in connection with the additional jib system in accordance with the invention and so to avoid repetition reference is made at this juncture initially to corresponding statements relating thereto.

Moreover, the cross-section change adapter in accordance with the invention configured in this manner allows it to be produced in a particularly favorable manner using less material in order to couple an additional jib part which is rectangular in cross-section to an additional jib part which is triangular in cross-section. The tensile forces produced in use e.g. in the single upper longitudinal chord, located on the upper side of the second additional jib part which is triangular in cross-section, of the second additional jib part can thus be introduced, substantially fifty-fifty, via the two upper chords of the cross-section change adapter into the two upper longitudinal chords, located on the upper side of the first additional jib part which is rectangular in cross-section, of the first additional jib part. At the same time, the two lower longitudinal chords, located on the lower side of the second additional jib part and generally loaded with compressive forces, of the second additional jib part can each be supported via one of the lower chords of the cross-section change adapter on the two lower longitudinal chords, likewise located on the lower side of the first additional jib part, of the first additional jib part. The actual stabilization of the cross-section change adapter which initially has a trapezoidal design at least at its right side and left side and its lower side occurs by the three transverse struts dividing these sides in a quasi cross-like manner and in this respect into triangles, and so an overall immovable structure for the cross-section change adapter is produced.

According to a preferred development of the cross-section change adapter in relation to its first connection side, its lower corner region connected to the first transverse strut and its upper corner region connected to the second transverse strut can be connected together by a diagonal strut. Alternatively thereto, its lower corner region which has no direct connection to the first transverse strut and its upper corner region which has no direct connection to the second transverse strut can be connected together by a diagonal strut. In both embodiments, an advantageous stiffening of the rectangular cross-sectional plane of the cross-section change adapter in the region of its first connection side is produced by the diagonal strut.

In accordance with a further aspect, the invention is additionally directed to a vehicle crane which has a main jib which is telescopic or/and luffable about a horizontal axis and is formed as a telescoping jib or a lattice mast jib.

In contrast to the tower cranes, described previously as being known, having horizontally oriented jib systems, on the lower side of which a trolley and an entrained lifting cable can move, the cable is guided in the additional jib system in accordance with the invention by means of auxiliary guides above the additional jib system. The auxiliary guides can vary between simple auxiliary brackets and fixedly installed or mounted rollers.

An exemplified embodiment of the invention which can be seen in the figures will be explained in greater detail with reference to the following description.

DESCRIPTION OF THE PREFERRED EMBODIMENTS

Figure 1:
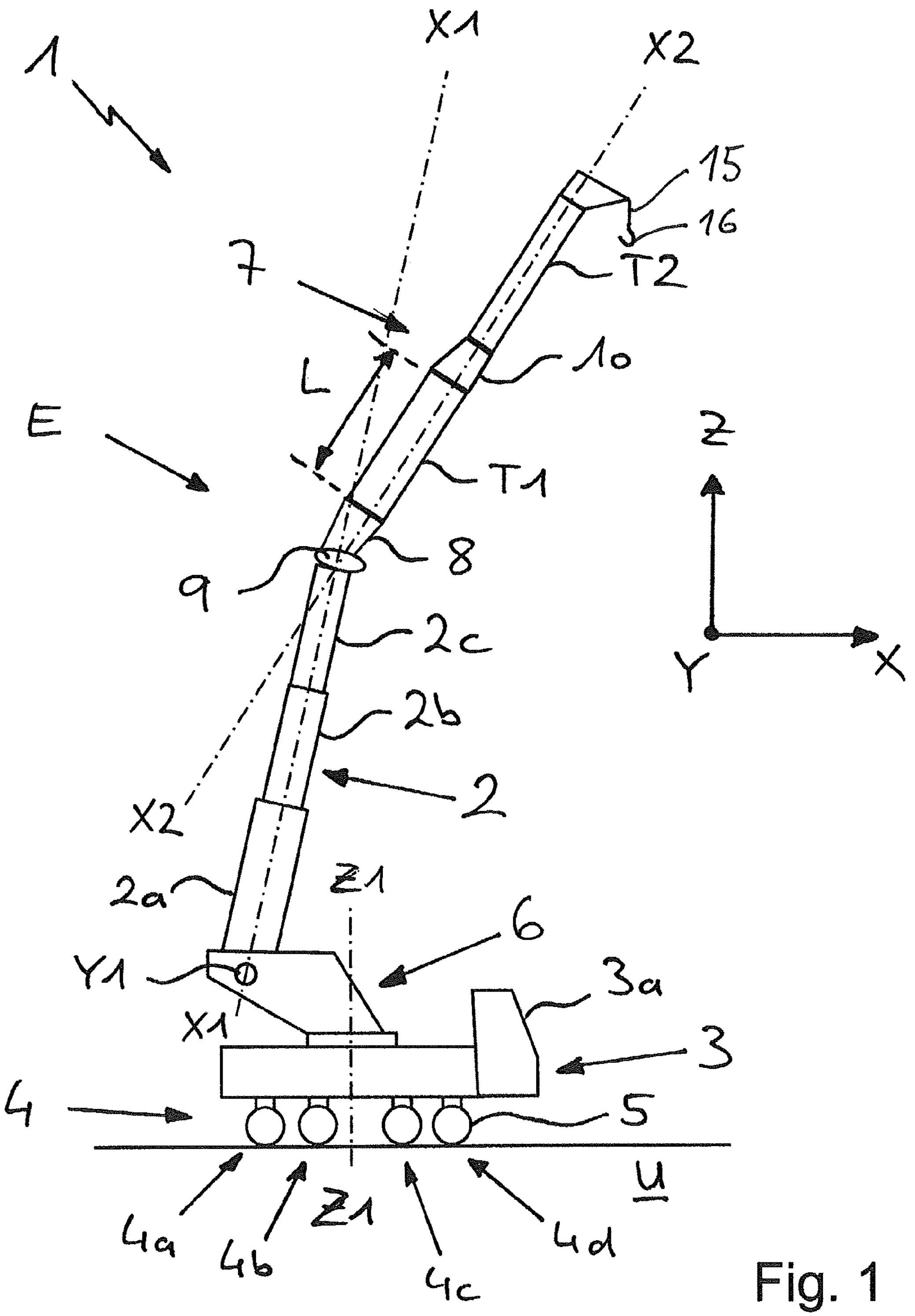
FIG. 1 shows a vehicle crane in accordance with the invention having an additional jib system in accordance with the invention in a side view.

FIG. 1 shows the structure of a vehicle crane 1 in accordance with aspects of the present invention in which the crane 1 is parked on a ground U and comprises in the exemplified embodiment illustrated here a telescopic main jib 2 and in this respect a telescoping jib with boxes 2*a*-2*c* arranged one inside the other and longitudinally displaceable relative to each other. Purely by way of example, in the present case one basic box 2*a* and two inner boxes 2*b* and 2*c* are shown. Alternatively, the main jib 2 can, of course, also be designed as a lattice mast jib (not shown here). The vehicle crane 1 has a lower carriage 3, oriented in the present case in parallel with a horizontal direction X, with a driver's cabin 3*a* which has a wheeled running gear unit 4 with, here by way of example, four axles 4*a*-4*d*, on each of which at least two rubber-tired wheels 5 spaced apart from each other in parallel with a transverse direction Y are rotatably arranged. Seated on the lower carriage 3 is a superstructure 6, supporting the main jib 2, which can be rotated relative to the lower carriage 3 about an axis of rotation Z1 extending in parallel with an upwards direction Z. The telescoping jib 2 extending in its longitudinal direction X1 is articulated on the superstructure 6 so as to be luffable via a horizontal pivot axis Y1 typically in an angular range of −4° to 87°. Therefore, the telescoping jib 2 is not vertical compared with a tower crane.

As can be seen, the main jib 2 is extended by an additional jib system 7 in accordance with the invention. In the present case, and purely by way of example, this is coupled to a jib head 9 of the main jib 2 with interpositioning of an adapter 8. Depending upon the design, the additional jib system 7 can also be coupled directly to the jib head 9 in a manner not shown in more detail here. In this case and purely by way of example, the adapter 8 is configured such that the additional jib system 7 extending in its longitudinal direction X2 is bent with respect to the longitudinal direction X1 of the main jib 2. The additional jib system 7 arranged in this respect at a free end section E of the main jib 2 includes a first additional jib part T1 and a second additional jib part T2, the first additional jib part T1 having a rectangular cross-section which cannot be seen in more detail here whilst the second additional jib part T2 has a triangular cross-section which likewise cannot be seen in more detail here. The two additional jib parts T1 and T2 are coupled together via a cross-section change adapter 10 in accordance with the invention, details of which are shown in more detail in FIG. 5. The two additional jib parts T1 and T2 form a common component of an auxiliary jib.

In a typical manner, a lifting cable extends, starting from a lifting mechanism winch, not shown, on the superstructure 6, above the main jib 2 and above the additional jib system 7 to a head of the additional jib system 7 and is deflected at that location in order to receive a hook 16 at its free end. The same applies for FIGS. 2 to 4.

Figure 2:
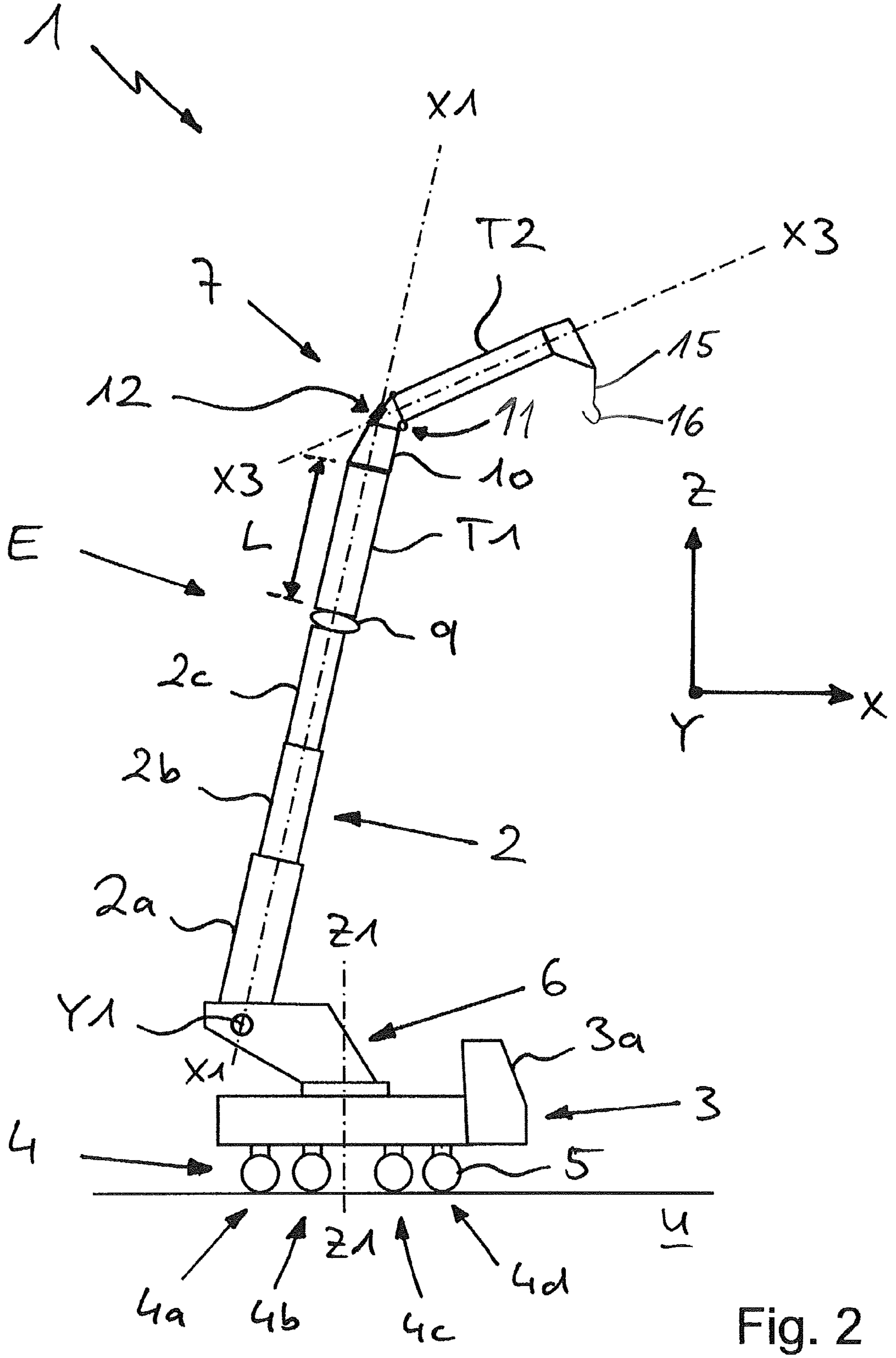
FIG. 2 shows the vehicle crane in accordance with the invention in a first alternative design having a first alternative of the additional jib system in an otherwise identical illustration.

FIG. 2 shows an alternative embodiment of the vehicle crane 1 with an additional jib system 7 which is likewise configured in an alternative manner. The additional jib system 7 is coupled to the jib head 9 of the main jib 2 directly via its first additional jib part T1. Without the adapter 8, the first additional jib part T1 now extends in parallel with or coaxially with respect to the longitudinal direction X1 of the main jib 2, whilst the second additional jib part T2 is bent in its longitudinal direction X3 with respect to the first additional jib part T1. In this respect, the second additional jib part T2 is pivotably supported on the cross-section change adapter 10 via a hinge assembly 11. A linear drive 12 acting between the cross-section change adapter 10 and the second additional jib part T2 is used to pivot the second additional jib part T2 about the hinge assembly 11 as required actively with respect to the cross-section change adapter 10. The first additional jib part T1 hereby forms a main jib extension, whilst the second additional jib part T2 is an auxiliary jib which can pivot with respect thereto.

Figure 3:
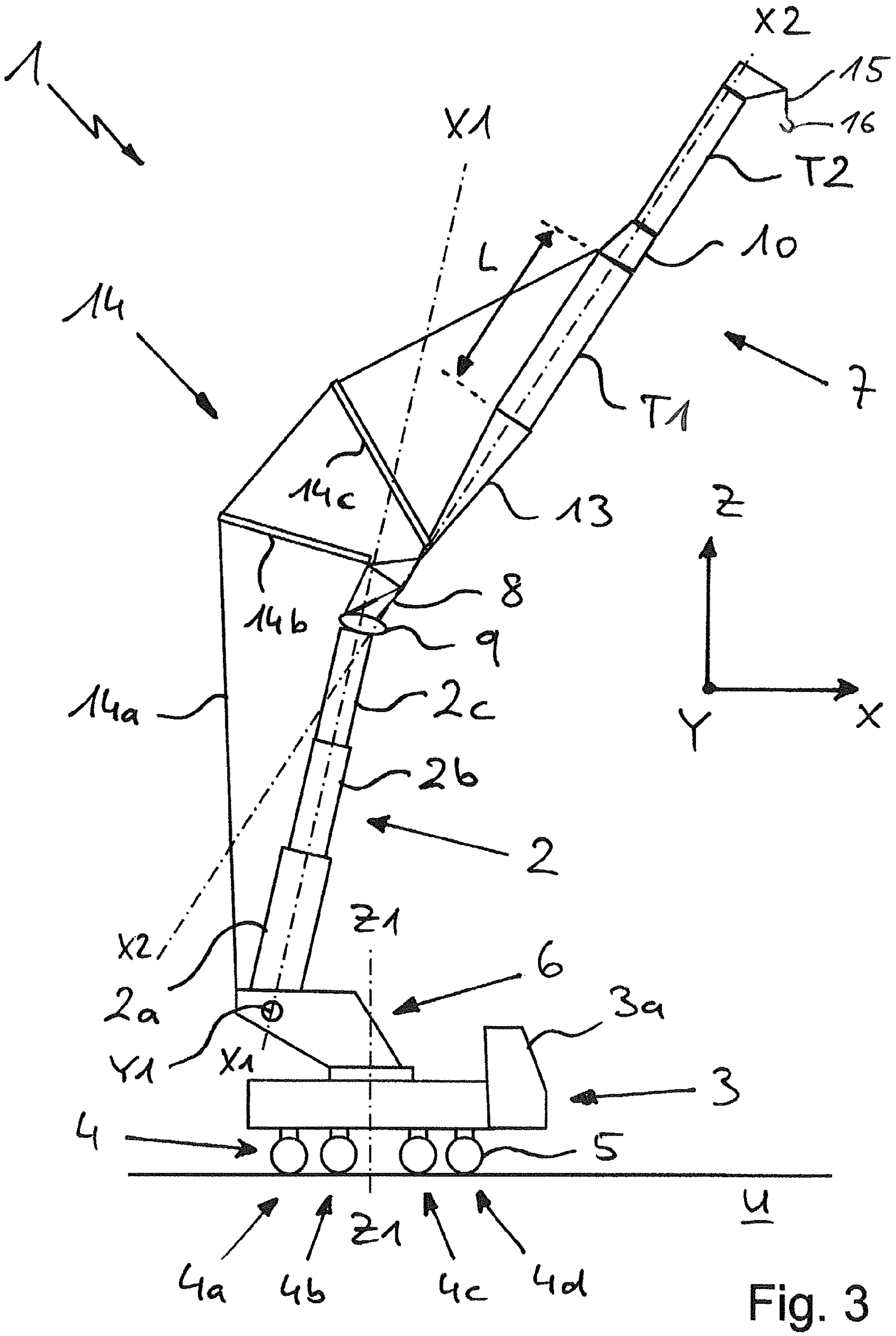
FIG. 3 shows the vehicle crane in accordance with the invention in a second alternative design having the additional jib system with a luffable foot piece in an otherwise identical illustration.

FIG. 3 shows a further, second alternative embodiment of the vehicle crane 1, the additional jib system 7 of which substantially corresponding to the above description. In order to achieve a further extension of the main jib 2, the additional jib system 7 is connected to the main jib 2 with the incorporation of a luffable foot piece 13. In turn, the luffable foot piece 13 is coupled to the jib head 9 via the adapter 8. For the purposes of stabilization and luffing, the vehicle crane 1 illustrated here additionally has a guying arrangement or guying system 14. In the present case, and purely by way of example, this includes a tensile means or tensioner 14*a* that comprises a tensile member or members, such as a rod, cable, band or chain, such as in a row and combinations thereof, and includes two guying supports 14*b* and 14*c*, via which the tensile means 14*a* is supported on the adapter 8 and on the luffable foot piece 13. The tensile means 14*a* is connected on the one hand to the superstructure 6 and on the other hand to the additional jib system 7, where it is connected purely by way of example to the cross-section change adapter 10.

Figure 4:
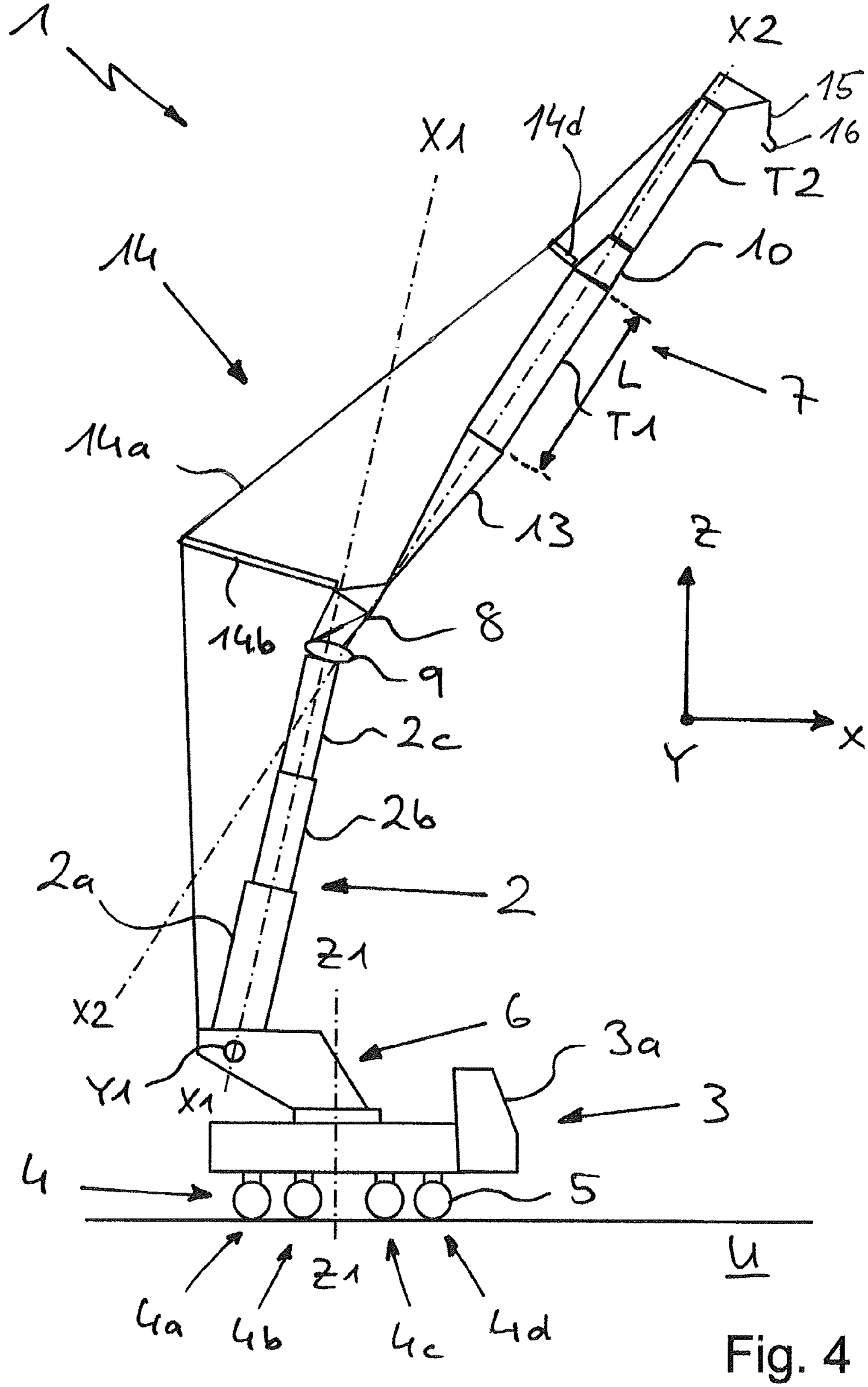
FIG. 4 shows the vehicle crane in accordance with the invention in a third alternative design having an alternative guying arrangement of the additional jib system in an otherwise identical illustration.

FIG. 4 shows a last alternative embodiment of the vehicle crane 1 which corresponds substantially to the embodiment shown in FIG. 3. In contrast thereto, the guying arrangement or guying system 14 is configured differently, in that the tensile means 14*a* thereof is further supported via the support or guying support 14*c* arranged on the adapter 8, whilst its further transverse guying arrangement 14*b* is connected to the cross-section change adapter 10 as a tensile member. Of course, this transverse guying arrangement 14*b* in the form of a support can also be provided on other components.

In all of the embodiments shown herein, the first additional jib part T1 can have a length L of e.g. 4.0 m to 150.0 m. Preferably, its length L can be 5.0 m to 65.0 m.

Figure 5:
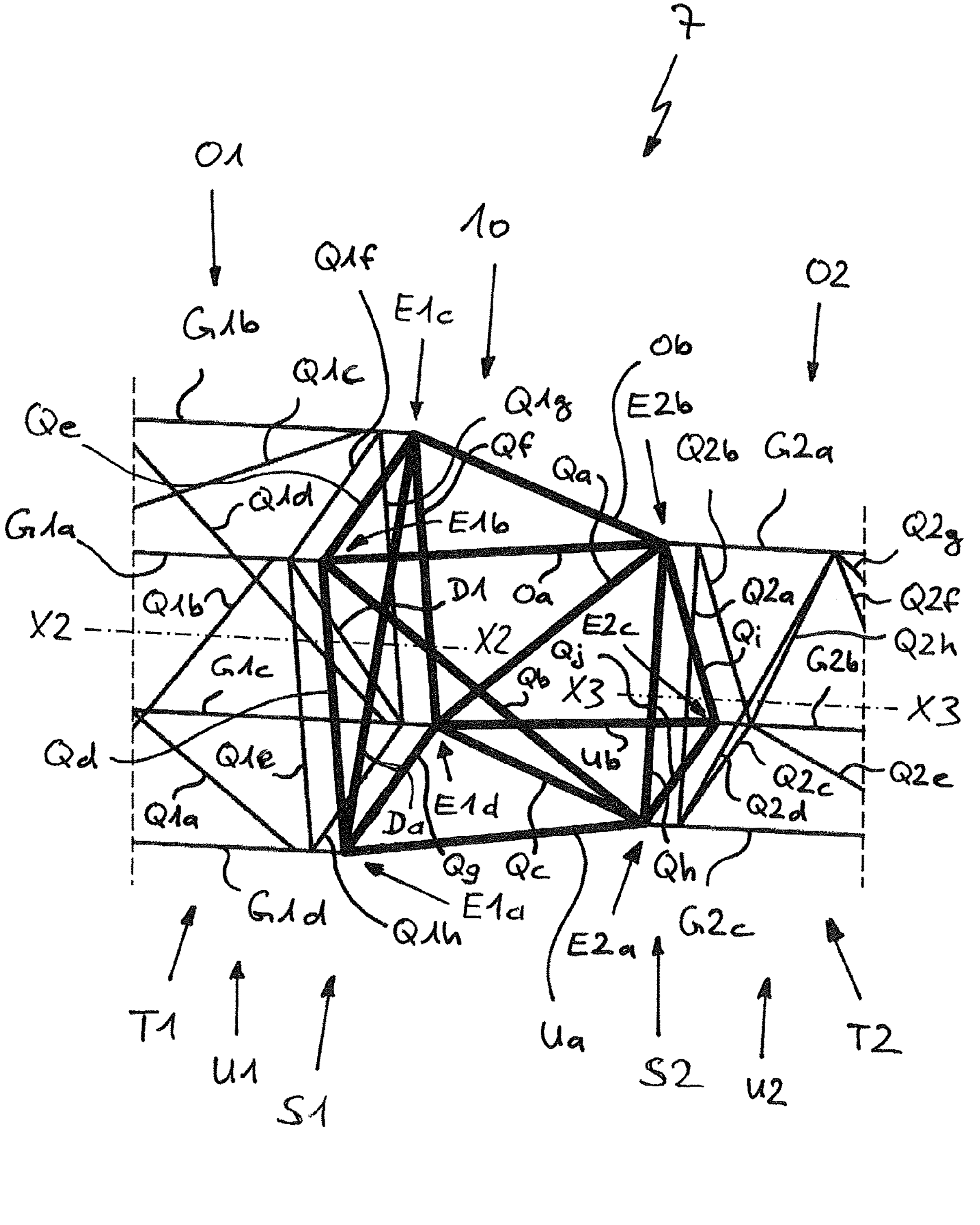
FIG. 5 shows a section of the additional jib system in accordance with the invention showing its cross-section change adapter in accordance with the invention in a perspective illustration.

FIG. 5 shows a section of the additional jib system 7 in which its cross-section change adapter 10 is located, this adapter connecting the two additional jib parts T1 and T2 and being clearly shown here with thick lines. The figure shows the first additional jib part T1 and also the second additional jib part T2 each formed as a lattice girder which has longitudinal chords G1*a*-G1*d*; G2*a*-G2*c* extending in parallel with their respective longitudinal directions X2 and X3 and transverse struts Q1*a*-Q1*h*; Q2*a*-Q2*h* connecting the longitudinal chords together and also diagonal struts D1*a*, wherein in the present case by way of example only one diagonal strut D1*a* of the first additional jib part T1 can be seen. The illustration shows the rectangular cross-section of the first additional jib part T1 and the triangular cross-section of the second additional jib part T2.

The cross-section change adapter 10 has a first connection side S1 coupled to the first additional jib part T1 and a second connection side S2 coupled to the second additional jib part T2. With reference to the illustration in FIG. 5, its first connection side S1 is located on the left-hand side and the second connection side S2 is located on the right-hand side. In the present case, the two connection sides S1 and S2 of the cross-section change adapter 10 extend in parallel with each other. Of course, these can also be inclined with respect to each other in a manner not shown in more detail, in order to incline the additional jib parts T1 and T2 with respect to each other. Owing to the aim of coupling to the first additional jib part T1, the first connection side S1 has a total of four corner regions E1*a*-E1*d* which span a correspondingly rectangular surface there between. Of these corner regions, two upper corner regions E1*b* and E1*c* are located on an upper side O1 of the first additional jib part T1, whilst the other two lower corner regions E1*a* and E1*d* are located on a lower side U1 of the first additional jib part T1 opposite the upper side O1. In contrast, the second connection side S2 provided for coupling to the second additional jib part T2 has a total of three corner regions E2*a*-E2*c*, which span a correspondingly triangular plane there between. Of these corner regions E2*a*-E2*c*, only one upper corner region E2*b* is located on an upper side O2 of the second additional jib part T2, whilst the remaining two lower corner regions E2*a* and E2*c* are located on a lower side U2 of the second additional jib part T2 opposite the upper side O2.

Looking at the design of the cross-section change adapter 10, it is clear that the two upper corner regions E1*b* and E1*c* of its first connection side S1 are connected to the upper corner region E2*b* of its opposite second connection side S2 in each case by an upper chord Oa and Ob. Said upper chords Oa and Ob thus form a quasi V-shape there between, the tip of which points towards the second connection side S2. Furthermore, the two lower corner regions E1*a*, E1*d* of the first connection side S1 are connected to one of the two lower corner regions E2*a*, E2*c* of the second connection side S2 by a lower chord Ua, Ub in each case. The two lower chords Ua, Ub extend with respect to each other such that they connect the directly opposite lower corner regions E1*a*, E2*a*; E1*d*, E2*c* of the two connection sides S1, S2 to each other and in this respect do not cross. In order to stiffen and further stabilize the cross-section change adapter 10 in particular with respect to movements, one of the lower corner regions E1*d* of the first connection side S1 is connected to the single upper corner region E2*b* of the second connection side S2 by a first transverse strut Qa. A further second transverse strut Qb is used for stiffening the opposite side of the cross-section change adapter 10 in that it connects the lower corner region E2*a* of the second connection side S2—diagonally opposite the lower corner region E1*d* of the first connection side S1 connected to the first transverse strut Qa—to the upper corner region E1*b* of the first connection side S1. A third transverse strut Qc connects the two diagonally opposite lower corner regions E1*d*, E2*a* of the first connection side S1 and the second connection side S2 to each other. In relation to the first connection side S1, in the present case the lower corner region E1*a*, which has no direct connection to the first transverse strut Qa and the upper corner region E1*c* which has no direct connection to the second transverse strut Qb are also connected together by a diagonal strut Da. Of course, the transverse struts Qa and Qb can also be arranged in a mirror-symmetrical manner and so the corner region E2*b* is connected to the two corner regions E1*d* and E1*a*. Alternatively, the surfaces which include E1*a*, E1*b*, E2*a*, E2*b* and E1*c*, E1*d*, E2*b*, E2*c* can be stiffened with a plurality of transverse struts.

The cross-section change adapter 10 can have further transverse struts Qd-Qg on its first connection side S1—as shown by way of example in FIG. 5—which struts are used to connect two corner regions E1*a*, E1*b*; E1*b*, E1*c*; E1*c*, E1*d*; E1*d*, E1*a* in each case. This can also be present on the second connection side S2, and so the corner regions E2*a*, E2*b*; E2*b*, E2*c*; E2*c*, E2*a* located there can also be connected together in each case via a transverse strut Qh-Qj.

Owing to the arrangement or/and design of the upper chords Oa and Ob and lower chords Ua and Ub and the transverse struts Qa-Qc, the longitudinal directions X2 and X3 of the two additional jib parts T1 and T2 can extend either congruently, and in this respect coaxially, non-parallel or else offset with respect to each other, as shown purely by way of example in FIG. 5. Furthermore, the vertical and/or horizontal dimensions on connection side S1 and connection side S2 can have different or identical orders of magnitude.

In an embodiment which is alternative to the previously described variant, the additional jib system can be rotated about its longitudinal axis by 180 degrees. In this way, the second triangular additional jib system T1 would then only have one lower chord, but two upper chords. It is also feasible for the cross-section change adapter 10 to be an integral component of the first additional jib part T1 or of the second additional jib part T2. The first additional jib part T1 could also be formed as a box girder.

Changes and modifications in the specifically described embodiments can be carried out without departing from the principles of the present invention which is intended to be limited only by the scope of the appended claims, as interpreted according to the principles of patent law including the doctrine of equivalents

The invention claimed is:

1. A vehicle crane comprising:

a luffable main jib and an additional jib system arranged on a free end section of the main jib and comprising a first additional jib part and a second additional jib part;

wherein the first additional jib part has a rectangular cross-section having four longitudinal chords connected together via transverse struts and/or diagonal struts, and wherein the second additional jib part has a triangular cross-section having three longitudinal chords connected together via transverse struts, and wherein the two additional jib parts are configured to be coupled together via a cross-section change adapter.

2. The vehicle crane as claimed in claim 1 further comprising a hinge assembly, and wherein the first additional jib part and/or the second additional jib part is/are supported on the cross-section change adapter so as to be pivotable via the hinge assembly.

3. The vehicle crane as claimed in claim 2, wherein at least one linear drive is provided by which the first additional jib part and/or the second additional jib part can be actively pivoted with respect to the cross-section change adapter.

4. The vehicle crane as claimed in claim 3, wherein the first additional jib part and/or the second additional jib part can be actively pivoted with respect to the cross-section change adapter about the hinge assembly by the at least one linear drive.

5. The vehicle crane as claimed in claim 1, wherein the first additional jib part and the second additional jib part are each rigidly fastened to the cross-section change adapter.

6. The vehicle crane as claimed in claim 1, wherein the additional jib system is guyed via a guying system, wherein the guying system is connected by an intermediate guying support to the first additional jib part and/or the second additional jib part and/or the cross-section change adapter.

7. The vehicle crane as claimed in claim 1, wherein a length of the first additional jib part is 4.0 m to 150.0 m.

8. The vehicle crane as claimed in claim 7, wherein the length of the additional jib part is 5.0 m to 65.0 m.

9. The vehicle crane as claimed in claim 1, wherein the first additional jib part and the second additional jib part are or form a common component of an auxiliary jib.

10. The vehicle crane as claimed in claim 9, wherein the auxiliary jib is free of a guying system and/or is luffable.

11. The vehicle crane as claimed in claim 1, wherein the first additional jib part is a main jib extension.

12. The vehicle crane as claimed in claim 1, wherein the second additional jib part is an auxiliary jib.

13. The vehicle crane as claimed in claim 1, wherein the cross-section change adapter includes a first connection side formed for coupling to the first additional jib part and a second connection side formed for coupling to the second additional jib part;

wherein the first connection side thereof has four corner regions spanning a rectangular or quadratic plane there between and the second connection side thereof has three corner regions spanning a triangular plane there between;

wherein two upper corner regions of the first connection side provided for arrangement in the region of an upper side of the first additional jib part are connected, in each case via an upper chord to an upper corner region of the second connection side provided for arrangement in the region of an upper side of the second additional jib part, and two lower corner regions of the first connection side provided for arrangement in the region of a lower side of the first additional jib part opposite its upper side are connected, in each case via a lower chord, to one of two lower corner regions of the second connection side provided for arrangement in the region of a lower side of the second additional jib part opposite its upper side, whilst one of the lower corner regions of the first connection side is connected to the upper corner region of the second connection side by a first transverse strut and one lower corner region of the second connection side diagonally opposite the lower corner region of the first connection side connected to the first transverse strut is connected to one of the upper corner regions of the first connection side by a second transverse strut, and two of the diagonally opposite lower corner regions of the first connection side and of the second connection side are connected together by a third transverse strut.

14. The vehicle crane as claimed in claim 13, wherein in relation to the first connection side, its lower corner region connected to the first transverse strut and its upper corner region connected to the second transverse strut or its lower corner region which has no direct connection to the first transverse strut and its upper corner region which has no direct connection to the second transverse strut are connected together by a diagonal strut.

15. The vehicle crane as claimed in claim 1, wherein the main jib is a telescoping jib or a lattice mast jib.

16. The vehicle crane as claimed in claim 1, wherein a lifting cable is guided above the additional jib system.

17. A vehicle crane comprising:

a luffable main jib and an additional jib system arranged on a free end section of the main jib and comprising a first additional jib part and a second additional jib part, wherein the first additional jib part is a main jib extension, and wherein the second additional jib part is an auxiliary jib;

wherein the first additional jib part has a rectangular cross-section having four longitudinal chords connected together via transverse struts and/or diagonal struts, and wherein the second additional jib part has a triangular cross-section having three longitudinal chords connected together via transverse struts, and wherein the two additional jib parts are configured to be coupled together via a cross-section change adapter.

18. The vehicle crane as claimed in claim 17, further comprising a hinge assembly, and wherein the first additional jib part and/or the second additional jib part is/are supported on the cross-section change adapter so as to be pivotable via a hinge assembly, and wherein at least one linear drive is provided by which the first additional jib part and/or the second additional jib part can be actively pivoted with respect to the cross-section change adapter about the hinge assembly.

19. The vehicle crane as claimed in claim 17, wherein the first additional jib part and the second additional jib part are each rigidly fastened to the cross-section change adapter.

20. The vehicle crane as claimed in claim 17, wherein the additional jib system is guyed via a guying system, wherein the guying system is connected by an intermediate guying support to the first additional jib part and/or the second additional jib part and/or the cross-section change adapter.

* * * * *